Nov. 22, 1966     B. BRONIEWSKI ETAL     3,287,580
ELECTRICAL MACHINES
Filed Nov. 22, 1963
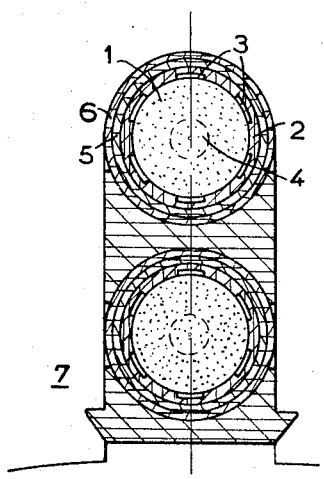
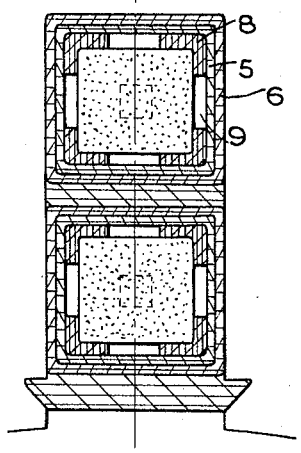
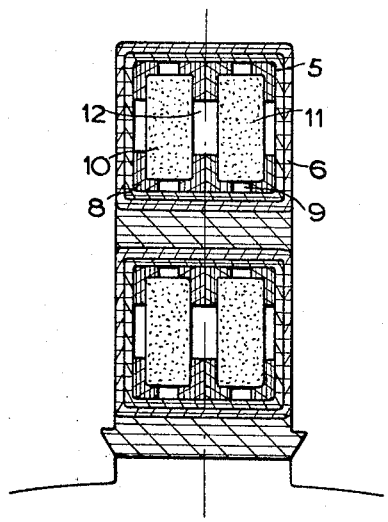
INVENTORS
B. Broniewski
A. E. Wolfhugel
ATTORNEY

United States Patent Office 3,287,580
Patented Nov. 22, 1966

3,287,580
ELECTRICAL MACHINES
Bohdan Broniewski, La Celle-Saint-Cloud, and Andre Edouard Wolfhugel, Belfort, France, assignors to Societe Generale de Constructions Electriques et Mecaniques (ALSTHOM), Paris, France, a French body corporate
Filed Nov. 22, 1963, Ser. No. 325,545
Claims priority, application France, Nov. 29, 1962, Patent 1,349,988
6 Claims. (Cl. 310—58)

In relation to electrical machines, particularly large alternating current generators, manufacturers and users pay great attention to, and are guided by, three essential factors, namely the cooling, the efficiency, and the overall dimensions.

The rapid increase in power per unit over the last few years is due to constructional techniques, improvements in the quality of certain materials, and to the practice of direct cooling of the coils or windings, all of which allow a more efficient use of the materials. However, if the power is so increased, the efficiency is reduced.

The difficulties inherent in the three factors mentioned above, and in relation to the unit powers exceeding those of the largest machines under construction, can be overcome if use is made of the property possessed by almost pure metals when brought to a low temperature, for example by helium, air or hydrogen in a liquid or even gaseous state, of presenting a very low resistance to the flow of electric current.

The present invention has as its object to cool by means of a fluid at a very low temperature, the coils or windings, of electrical machines in which the coil bars or conductors are composed of wires of small diameter or of thin ribbons, of a metal or conductive alloy as pure as can be obtained, insulated from one another, and separated from the magnetic circuit which supports them and from the external environment both by a thermal and by an electrical insulator.

According to the present invention, the thermal insulator surrounding the assembly of wires or ribbons, or a part thereof, is partly hollow in such a way as to form a number of longitudinal channels which are in contact with the assembly and through which flows the cooling fluid.

A controlled cryogenic system may be provided to supply the fluid refrigerant to, and circulate it around, the bars at a very low temperature where it absorbs heat from the bars and may, for example, be converted from a liquid into a gas. The cryogenic system then cools, and if necessary, reliquifies the refrigerant and then recirculates it. The cryogenic system, together with any additional elements, which may be necessary, circulate the refrigerant and maintain a constant temperature in the cooled coil, corresponding, for example, to the minimum losses of the coil.

In order that the invention may be more readily understood, various embodiments thereof, which relate especially to armature coils of turbo-alternators, will now be described with reference to the accompanying drawing, in which:

FIGURE 1 is a partial section, in a plane perpendicular to the axis of rotation of the rotor of one of the uniformly distributed slots of a stator of an alternating current generator, containing two winding or coil bars of circular cross-section.

FIGURE 2 is a similar section of a slot containing two rectangular bars.

FIGURE 3 is a similar section of a slot containing divided bars.

Referring to FIGURE 1, each coil bar 1 is composed of a plurality of wires of a metal such as copper, aluminium or a conductive alloy, as pure as possible. These wires are of a small diameter, for example a fraction of a millimetre, electrically insulated from each other either by a layer of oxide or by an enamel or a synthetic material, and are twisted together in such a way that the bar has a certain rigidity, which may be increased by impregnating it with a thermo-setting resin filling the interstices between the individual wires. Each individual wire, due to the manner of twisting, changes position or is transposed within the bar along its length, and occupies all positions in the height of the bar. The results obtained by this transposition, for example the appreciable decrease in the overall electrical losses due to the currents in the winding as a whole are equivalent to those of a conventional bar, such as a bar of the Roebel type, (described in U.S. Patent 1,144,252). The assembly of conductive wires of each bar is surrounded by juxtaposed segments 2 of a material which presents a great resistance to the passage of heat, and is partly hollowed so as to form an assembly of longitudinal channels 3 in contact with the wires. A fluid coolant, such as a liquified gas at a low temperature circulates through the channels 3 and ensures that the wires are cooled over a large surface area. If necessary a supplementary axial channel 4 may be provided in the centre of the bar, which can be obtained by omitting some of the strands of the wire, and an extra thermal insulator 5 presenting a high resistance to the passage of heat may be provided, composed of a ribbon covering the segments 2, for decreasing the load on the cryogenic apparatus. A dielectric insulator 6 separates the bars from the mass of the magnetic circuit 7, the insulator 6 being spaced from the channels 3 by the material of the thermal insulators 2 and 5. The thermal insulators 2 and 5 are formed of a material or materials having such a high thermal resistance, i.e., a low coefficient of thermal conductivity, that the coolant is extremely well isolated from the magnetic circuit 7.

The bars are connected to inlet and outlet conduits (not shown) for the cooling fluid by means of suitable sockets (not shown) attached to tubes which are preferably of insulating material, the assembly being insulated from the exterior environment by a covering composed of a good thermal insulator. The ends of the bars and the sockets are covered in addition by an electrical insulator, whilst a metal connection between the latter ensures electric connection between the bars.

These arrangements enable the electrical resistance of the bars to be substantially reduced due to cooling thereof, allowing heavy current flow in a small conductor area, and also have the advantage of appreciably decreasing the dimensions of the machines, as well as their overall losses for a given rating, or of increasing appreciably their power while maintaining their weight and efficiency at given values.

In the example in FIGURE 2, the bars are rectangular in form, and may be composed of wires, as in FIGURE 1, or of thin ribbons, insulated from one another as in the case of the wires, and disposed in such a way that the stacking of the ribbon is done according to the level or depth of the slots. The compactness and rigidity of these bars composed of ribbons can be ensured by impregnating them with thermosetting resins. Corner-pieces 8 are applied to the angles of the bar to provide them with ducts 9 for the passage of the cooling fluid. The thermal insulator 5 and the dielectric insulator 6 separate the conductors and the fluid from the exterior.

The dielectric insulator 6 may be made of any conventional electrical insulating material, such for example as sheaths of paper, glass or mica tape agglomerated with a synthetic thermo-setting resin. However, such electrical insulators only have a thermal conductivity of the order of $10^{-3}$ watts/cm.°K., which is insufficient to permit their use for the thermal insulators 2 and 5. These thermal insulators may be of the type described in U.S. Patents Nos. 3,007,596 and 3,009,600, which have a very low thermal conductivity of the order of $10^{-6}$ or $10^{-7}$ watts/cm.°K.

FIGURE 3 relates to an embodiment in which the width of the bars makes it preferable that they each be divided into two parts 10 and 11 in order to ensure more effective cooling. The same elements are shown in this embodiment as in FIGURE 2, with the addition that a channel 12 is provided in contact with and between the two parts 10 and 11 of the bar.

We claim:

1. In an electrical machine, a coil consists of a plurality of conductor bars mounted in slots in the magnetic circuit of the machine, each conductor bar comprising a plurality of small diameter wires, of substantially pure metal or alloy, twisted together to form a single assembly of generally circular cross-section with each wire occupying various different positions within said bar along its length, a first insulator adapted primarily to electrically insulate the individual wires from each other, a second insulator, primarily a superior thermal insulator, surrounding said bar, passages extending along the bar adjacent said assembly in said second insulator, for circulating a very low temperature liquid coolant for cooling said bar, and substantially reducing the electrical resistance thereof, a third insulator, primarily a superior thermal insulator, surrounding said second insulator, and a fourth insulator surrounding said third insulator and adapted primarily to electrically insulate the assembly from the magnetic material of the machine, said second and third insulators having very low coefficients of thermal conductivity to minimize heat transfer between the coolant and said magnetic material of the machine.

2. In an electrical machine, a plurality of coil conductor bars mounted in slots in the magnetic field of the machine, each bar comprising a plurality of thin ribbons, of a substantially pure metal or alloy, stacked upon each other to form an assembly of generally rectangular cross-section, a first insulating material between said ribbons, primarily electrically insulating said ribbons from one another, a second insulator having essentially a very low coefficient of thermal conductivity, including "L" section strips located around each corner of said assembly and extending along said bar, a third insulator, having essentially a very low coefficient of thermal conductivity surrounding said assembly and said second insulator, the inwardly directed surface of said third insulator forming with the side edges of said "L" section strips and the outer surface of said assembly, a plurality of longitudinally extending passages for circulating an extremely low temperature fluid coolant, to cool the bar and reduce the electrical resistance thereof, and a fourth insulator surrounding said third insulator to primarily electrically insulate said assembly from the slot within which the bar is located.

3. Apparatus according to claim 2, wherein said assembly is impregnated with a thermo-setting resin, and is provided with a supplementary coolant passage extending longitudinally therethrough.

4. Apparatus according to claim 1, wherein said assembly is impregnated with a thermo-setting resin, and a supplementary coolant passage extends along the bar within said assembly.

5. For an electrical machine, a coil winding having a section comprising an assembly of individual elongated electrically conducting elements of a substantially pure metal or alloy, first insulating means electrically insulating said elements from each other, second insulating means, possessing essentially superior thermal insulating properties, at least partially surrounding said assembly and at least partially defining with a surface of the assembly at least one channel extending along said bar adjacent said assembly, to receive a low temperature fluid coolant for cooling the bar, third insulating means, possessing essentially superior thermal insulating properties, surrounding said second insulating means and fourth insulating means surrounding said third insulating means to electrically insulate said assembly and said other insulating means from the magnetic circuit of the machine.

6. For an electrical machine, a coil winding having a section comprising an assembly of individual elongated electrically conducting elements of a substantially pure metal or alloy, first insulating means electrically insulating said elements from each other, second insulating means, possessing essentially an extremely low coefficient of thermal conductivity, at least partially surrounding said assembly and at least partially defining at least one channel extending along and adjacent said assembly to receive a low temperature fluid coolant for cooling the bar, third insulating means surrounding said second insulating means, to electrically insulate said assembly from the magnetic circuit of the machine, said at least one channel being spaced from and effectively thermally isolated from said third insulating means by the material of said second insulator.

References Cited by the Examiner

UNITED STATES PATENTS

| | | | |
|---|---|---|---|
| 2,573,670 | 10/1951 | Moses | 310—64 |
| 2,788,456 | 4/1957 | Fromm | 310—64 |
| 2,898,484 | 8/1959 | Krastchew | 310—52 |

MILTON O. HIRSHFIELD, *Primary Examiner.*

ORIS L. RADER, *Examiner.*

L. L. SMITH, *Assistant Examiner.*